United States Patent [19]

Reese et al.

[11] 4,151,633

[45] May 1, 1979

[54] METHOD OF SECURING IDENTIFICATION TAG TO DRUM BY TOP CHIME

[75] Inventors: Robert H. Reese, Wheaton; Gerhardt Facko, Blue Island, both of Ill.

[73] Assignee: Greif Bros. Corporation, Delaware, Ohio

[21] Appl. No.: 897,252

[22] Filed: Apr. 18, 1978

Related U.S. Application Data

[62] Division of Ser. No. 757,020, Jan. 5, 1977.

[51] Int. Cl.² .................... B21D 39/00; B23P 11/00

[52] U.S. Cl. .................... 29/510; 40/306; 113/120 XY;120 Y; 229/5.5; 229/74

[58] Field of Search .................... 29/510; 113/120 XY, 113/120 Y; 229/5.6, 5.7, 74; 40/20 R, 306

[56] References Cited

U.S. PATENT DOCUMENTS

| | | | |
|---|---|---|---|
| 659,082 | 10/1900 | Lustig | 40/306 |
| 971,804 | 10/1910 | Thompson | 40/20 R |
| 1,297,405 | 3/1919 | Saunders | 40/20 R |
| 1,343,953 | 6/1920 | Walters | 40/306 X |
| 2,023,977 | 12/1935 | Schwartz | 29/510 UX |
| 2,049,729 | 8/1936 | Berkowitz | 220/74 |
| 2,130,732 | 9/1938 | Christian | 40/306 |
| 2,966,378 | 12/1960 | Carpenter et al. | 229/5.6 UX |
| 3,107,037 | 10/1963 | Rodish | 229/5.6 |
| 3,422,558 | 1/1969 | Fee | 40/20 R X |
| 3,914,852 | 10/1975 | Fisher | 29/510 X |

*Primary Examiner*—Charlie T. Moon

*Attorney, Agent, or Firm*—Kane, Dalsimer, Kane, Sullivan and Kurucz

[57] ABSTRACT

A drum is provided with an identification tag secured to the top chime construction. A wire loop having the tag at its free end is in frictional engagement at its other end between the top chime strip and the underlying associated material of the drum wall. This arrangement is accomplished by properly twisting the wire loop, placing it over the top of the drum wall so that it projects downwardly on both the interior and exterior walls. The top chime is placed on the top of the drum wall with the wire loop interposed therebetween. The beading operation is then completed following which the identification tag is secured to the top chime construction of the drum.

4 Claims, 6 Drawing Figures

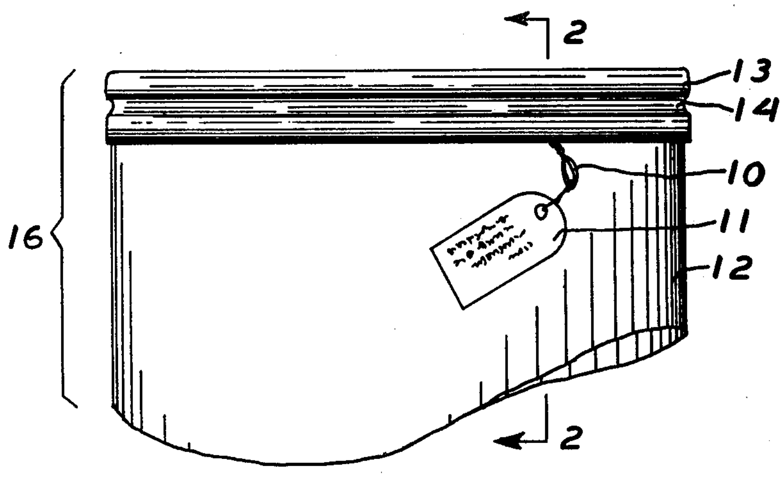
FIG. 1
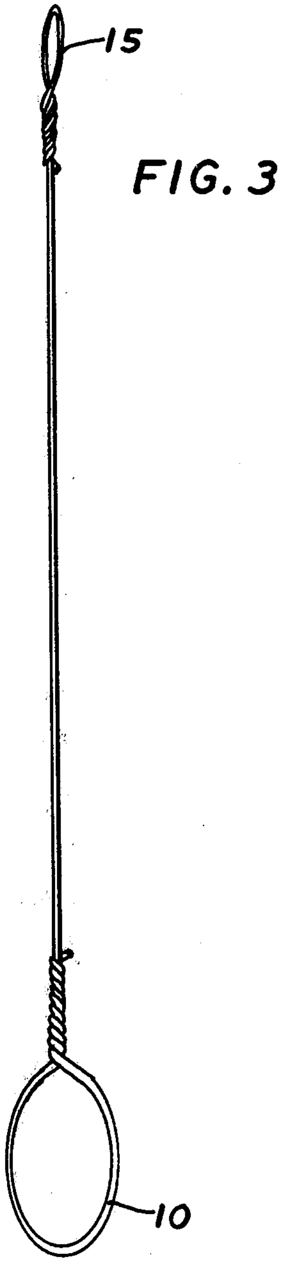
FIG. 3
FIG. 2
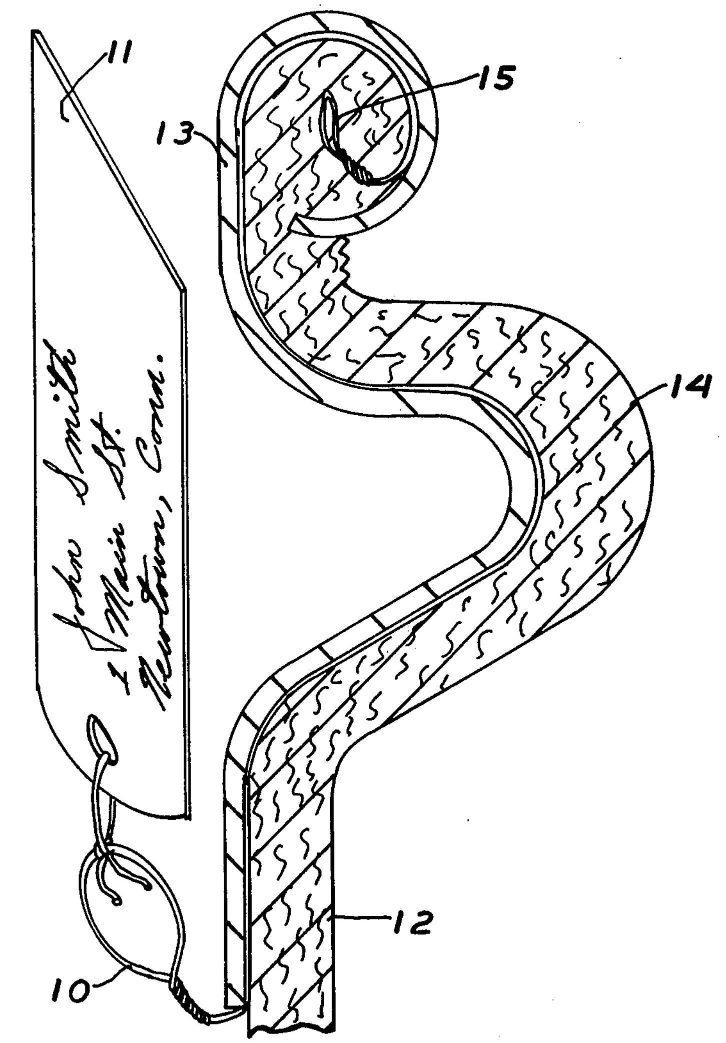

FIG. 4
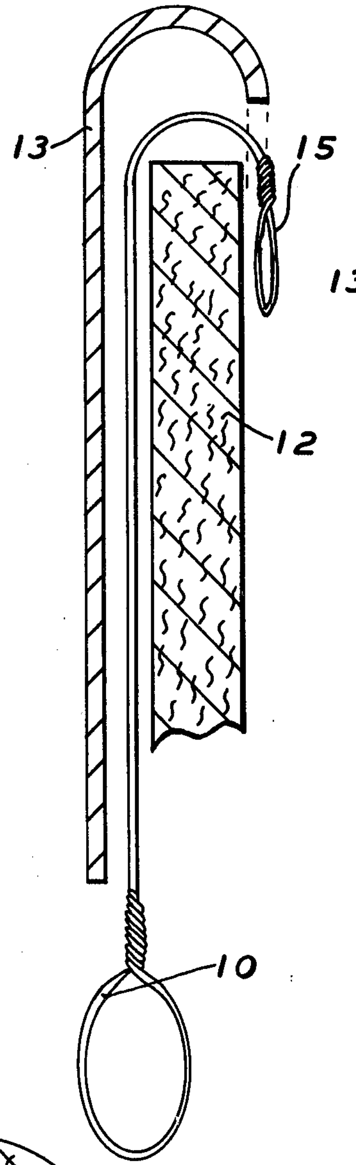
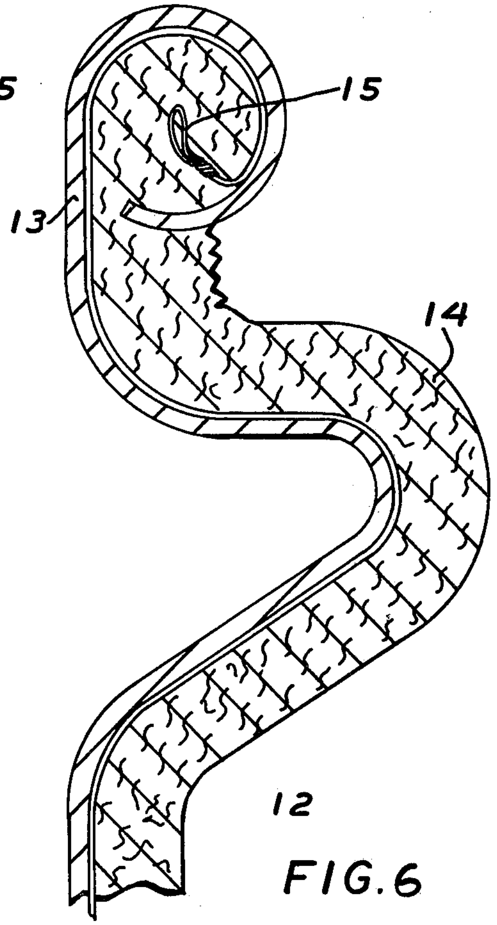
FIG. 6
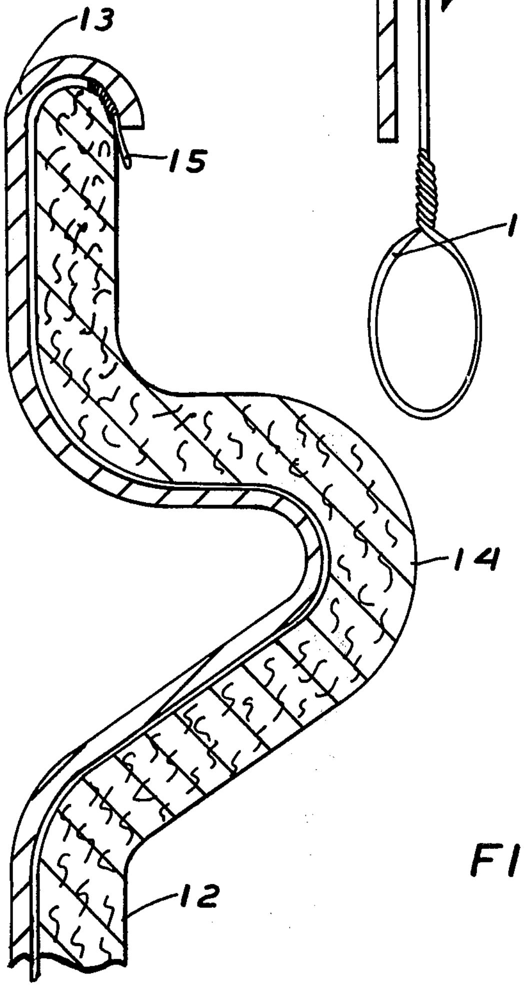
FIG. 5

METHOD OF SECURING IDENTIFICATION TAG TO DRUM BY TOP CHIME

This is a division of application Ser. No. 757,020, filed Jan. 5, 1977.

BACKGROUND OF THE INVENTION

There are various methods and techniques employed for applying data cards or other forms of indicia to drums and containers. For example, a label may be attached to a part of the drum and may be placed either on the drum itself or on its cover. If such information is placed on the cover, however, and the cover is removed or exchanged, the pertinent data and information could be then completely lost or even be incorrect.

If labels are glued to the drums, their removal would be very difficult. Such removal is often necessary as the container goes down through production, and a series of inspectors desire to affix the appropriate labels. If the drum is later to be used for a different purpose, it will also be necessary to attach the correct identification label.

SUMMARY OF THE INVENTION

It is an object of the invention to provide an effective and improved means for permitting the securement of an identification tag to a drum which will allow its simple removal and installation of another tag bearing different data.

It is another object of the invention to secure such tags to the drum itself and without the use of an adhesive, so as to avoid possible confusion when the covers of the drums are removed or exchanged.

Still another object of this invention is to provide a simple method of incorporating a means for attaching tags, data cards or other identification to a drum without any substantial changes in the manufacturing process of such drums, thereby necessitating a minimum of added expense and labor.

In general, the invention provides an improved drum or container in which the means for affixing identification labels is incorporated within the structure of the drum itself. The shell defining the walls or body of the drum is first constructed, and a wire loop of suitable length is cut. The wire is placed over the top or upper rim of the shell so that it projects downwardly on the exterior, and downwardly a short distance on the interior of the shell. A chime strip of suitable material is then forced over the top edge of the shell, and over the wire loop which is maintained in the proper configuration by having been looped over the upper rim. When the shell is ready for the beading operation, it is placed in a shell beader to be formed into the desired shape. The wire loop is formed right along with the bead, and projects from the lower outer edge of the top chime strip. In this manner the wire loop is secured by frictional engagement between the shell and the chime strip.

Other objects and advantages will become apparent from the following detailed description which is taken in conjunction with the accompanying drawings.

BRIEF DESCRIPTION OF THE DRAWINGS

In the drawings:

FIG. 1 is a fragmentary elevation view of the drum with the wire loop and data tag or card attached;

FIG. 2 is an enlarged fragmentary sectional view taken along the lines 2—2 of FIG. 1

FIG. 3 is an elevation view of the wire loop before attachment to the top chime construction:

FIG. 4 is an enlarged fragmentary sectional view of the wire loop applied to the top or upper rim of the drum body or shell;

FIG. 5 is a similar view after the chime strip has been applied to the top of the drum shell and an inwardly extending bead is formed in the strip and shell; and FIG. 6 is a similar view of the top chime construction as completed.

DETAILED DESCRIPTION OF THE PREFERRED EMBODIMENT

In the drawings, the improved drum 16 is shown with an identification tag 11 secured thereby by an interposed loop of wire 10 as shown in FIG. 1 and referred to by the numeral 16. The wire is attached by means of frictional engagement by being embedded between the drum shell 12 and the top chime strip 13 following completion of the top chime construction. The free end of the wire loop 10 projects outwardly from beneath the chime strip 13. The wire loop and tag or label may, of course, be affixed to either the top or bottom of the drum.

It should be understood that a number of materials would be suitable for the manufacture of the drum, chime, and wire loop. The drum body may be formed of wound laminated layer of adhesively secured fibrous material on a shell winding machine and then cut to the desired length. The wire loop may be composed of any suitable metal, although a non-metallic cord could also be employed. The chime may be metallic and preferably steel, as both strength and ductility are desirable parameters to facilitate the manufacture of the drum of this invention.

In FIGS. 4 to 6 the process of manufacturing the completed drum of this invention is shown and as will be apparent to those skilled in the art, the method of constructing a fiber drum having top and bottom chime strips need not be radically altered. After the shell 12 of the drum has been cut to its desired length, the wire loop 10 of FIG. 3 is placed over the top or upper rim of the shell so that it projects downwardly on both the interior and exterior walls as depicted in FIG. 4. The larger looped portion of the wire loop 10 is located on the exterior free end so that it may be used to affix the appropriate tag, label or data card. The metallic chime is then placed over the top of the shell as shown in FIG. 4 with the wire loop now located between these parts. When the shell is ready for the beading operation, it is placed in a shell beader and formed into the desired shaped bead 14. FIG. 5 shows this shape to be a groove on the outside of the drum with the corresponding rib shaped protrusion on the inside of the shell. The wire loop 10 assumes the shape of the bead, and projects below the outer bottom edge of the chime stop 13 (see FIGS. 1 and 2) and the major part of the inner loop end 15 is disposed between the chime strip and inner surfaces of the shells. The top chime construction is then completed by placing the beaded shell in a hydraulic press forming die which curls the top edge of the chime over securely and shapes the bead 14 to give it its final dimensions. (see FIG. 2) This final step assures that the inner end 15 of the wire loop 10 is tightly embedded between the chime strip 13 and shell 12 so that slippage and/or loss of the loop will not occur.

The completed drums are particularly well adapted for use in the chemical, food and medical industries which often times require attached data cards, inspector's reports, analysis statements, etc.

It should be understood that the foregoing description and drawings are to be considered illustrative and not restrictive in character. Only the preferred embodiment has been shown and described, and protection is desired for all modifications possible by those skilled in the art that come within the spirt of the invention.

What is claimed is:

1. A method for attaching a means of identification to a drum which comprises:

a. placing a loop of elongated material over the top of the shell of the drum so that it projects downwardly on at least the exterior of said shell;

b. placing a chime strip over the top edge of said shell and said wire loop; and c. forming the chime strip and top of the shell into a top beaded chime construction with said wire loop projecting below the exterior edge of said chime strip and secured by the top chime construction.

2. The method of claim 1, wherein the shell is a fiber shell, the chime strip is metallic and the loop is metallic wire.

3. The method of claim 1, wherein said loop is a non-metallic cord.

4. The method of claim 1, wherein the top chime construction includes an inwardly extending bead in the chime and shell and an inward curl of the top of the chime strip over the associated part of the shell.

* * * * *